United States Patent
Plechey et al.

(10) Patent No.: US 11,027,756 B2
(45) Date of Patent: *Jun. 8, 2021

(54) ECP OVERLAY SYSTEM FOR UIC-TYPE DISTRIBUTOR VALVE

(71) Applicant: Westinghouse Air Brake Technologies Corporation, Wilmerding, PA (US)

(72) Inventors: Michael S. Plechey, Jeannette, PA (US); Jeffrey B. Skweres, McKeesport, PA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 210 days.

This patent is subject to a terminal disclaimer.

(21) Appl. No.: 16/174,788

(22) Filed: Oct. 30, 2018

(65) Prior Publication Data

US 2019/0144018 A1     May 16, 2019

Related U.S. Application Data

(60) Provisional application No. 62/587,080, filed on Nov. 16, 2017.

(51) Int. Cl.
*B60T 13/66* (2006.01)
*B61H 13/34* (2006.01)
(Continued)

(52) U.S. Cl.
CPC ............ *B61H 13/34* (2013.01); *B60T 13/665* (2013.01); *B60T 15/027* (2013.01); *B60T 15/184* (2013.01); *B61H 13/20* (2013.01)

(58) Field of Classification Search
CPC ...... B60T 13/665; B60T 13/683; B60T 15/42; B60T 15/048; B60T 15/184; B60T 15/021; B60T 15/027
See application file for complete search history.

(56) References Cited

U.S. PATENT DOCUMENTS 1,281,801 A * 10/1918 Macloskie ............ B60T 13/665
 303/26
3,823,984 A *  7/1974 Parfitt ........................ B60L 7/24
 303/3
(Continued)

FOREIGN PATENT DOCUMENTS

AU         199744431 B2    1/1998
AU         199737600 B2    3/1998
(Continued)

*Primary Examiner* — Bradley T King
*Assistant Examiner* — Stephen M Bowes
(74) *Attorney, Agent, or Firm* — Christopher R. Carroll; The Small Patent Law Group LLC (57) ABSTRACT

An ECP overlay system for a UIC-type distributor valve includes a manifold body having a pipe bracket face configured to engage a face of a pipe bracket of a brake system, a valve face configured to engage a face of a UIC-type distributor valve of a brake system, and an electric manifold face. The system further including an electric manifold assembly engaged with the electric manifold face of the manifold body, with the electric manifold assembly having a pneumatic mode where the electric manifold assembly is configured to allow pneumatic-only control of a brake cylinder of brake system and an ECP mode where the electric manifold assembly is configured to allow electronic control of a brake cylinder of a rbrake system.

15 Claims, 7 Drawing Sheets

(51) Int. Cl.
*B60T 15/18* (2006.01)
*B60T 15/02* (2006.01)
*B61H 13/20* (2006.01)

(56) References Cited

U.S. PATENT DOCUMENTS

| | | | |
|---|---|---|---|
| 4,598,953 | A | 7/1986 | Wood et al. |
| 4,652,057 | A | 3/1987 | Engle et al. |
| 5,335,974 | A | 8/1994 | Klink |
| 5,393,129 | A | 2/1995 | Troiani et al. |
| 5,503,467 | A | 4/1996 | Gaughan |
| 5,613,741 | A * | 3/1997 | Shank ............... B60T 13/665 303/36 |
| 5,676,431 | A | 10/1997 | McLaughlin et al. |
| 5,730,504 | A | 3/1998 | Gaughan |
| 5,738,417 | A | 4/1998 | Wood et al. |
| 5,746,484 | A | 5/1998 | Gaughan et al. |
| 5,813,730 | A | 9/1998 | Force |
| 5,881,768 | A | 3/1999 | Bezos et al. |
| 5,967,620 | A | 10/1999 | Truglio et al. |
| 5,984,427 | A | 11/1999 | Kettle, Jr. |
| 5,988,766 | A | 11/1999 | McCurdy, Jr. |
| 6,024,419 | A | 2/2000 | Waldrop et al. |
| 6,035,250 | A | 3/2000 | Newton et al. |
| 6,039,409 | A | 3/2000 | Engle |
| 6,086,163 | A | 7/2000 | Klink et al. |
| 6,120,109 | A | 9/2000 | Wood et al. |
| 6,126,247 | A | 10/2000 | Paul et al. |
| 6,142,442 | A | 11/2000 | Carroll |
| 6,189,980 | B1 | 2/2001 | Kull |
| 6,213,565 | B1 | 4/2001 | Hart |
| 6,217,126 | B1 | 4/2001 | Kull |
| 6,318,812 | B1 | 11/2001 | Newton et al. |
| 6,375,277 | B1 | 4/2002 | Carroll |
| 6,416,034 | B1 | 7/2002 | Sich |
| 6,422,531 | B1 | 7/2002 | Sich |
| 6,457,782 | B1 | 10/2002 | Truglio et al. |
| 6,472,769 | B1 | 10/2002 | Long, Jr. et al. |
| 6,484,085 | B2 | 11/2002 | Marra et al. |
| 6,508,519 | B1 | 1/2003 | Tate |
| 6,520,599 | B2 | 2/2003 | Wood et al. |
| 6,626,506 | B2 | 9/2003 | Kettle, Jr. |
| 6,676,229 | B1 | 1/2004 | Marra et al. |
| 6,839,664 | B1 | 1/2005 | Kull |
| 6,964,456 | B2 | 11/2005 | Root |
| 6,964,457 | B2 | 11/2005 | Kettle, Jr. |
| 6,979,061 | B1 | 12/2005 | Lumbis et al. |
| 7,144,090 | B2 | 12/2006 | Kull et al. |
| 7,240,970 | B2 | 7/2007 | Reynolds et al. |
| 7,357,463 | B2 | 4/2008 | Barberis et al. |
| 8,049,608 | B2 | 11/2011 | Gaughan |
| 8,226,174 | B2 | 7/2012 | Wright |
| 9,421,960 | B2 | 8/2016 | Grasso et al. |
| 9,481,348 | B2 | 11/2016 | Wolf |
| 9,481,350 | B2 | 11/2016 | White et al. |
| 2005/0099061 | A1 | 5/2005 | Hollandsworth et al. |
| 2009/0229932 | A1 | 9/2009 | Reynolds et al. |
| 2011/0126732 | A1 | 6/2011 | Lumbis et al. |
| 2014/0049037 | A1 | 2/2014 | White et al. |
| 2016/0068148 | A1 * | 3/2016 | Connell ............... B60T 13/665 303/30 |
| 2016/0082939 | A1 | 3/2016 | Cole |
| 2016/0096517 | A1 | 4/2016 | Burgess et al. |
| 2019/0144017 | A1 * | 5/2019 | Skweres ............ B60T 17/228 303/15 |
| 2019/0144019 | A1 * | 5/2019 | Skweres ............ B60T 15/184 303/15 |

FOREIGN PATENT DOCUMENTS

| | | |
|---|---|---|
| AU | 199852725 B2 | 6/1998 |
| AU | 199852063 B2 | 7/1998 |
| AU | 199868072 | 1/1999 |
| AU | 199864810 B2 | 4/1999 |
| AU | 199873974 A1 | 9/1999 |
| AU | 199887118 A1 | 9/1999 |
| AU | 199887911 B2 | 10/1999 |
| AU | 199961796 B2 | 11/1999 |
| AU | 199947586 A1 | 3/2000 |
| AU | 199958760 B2 | 4/2000 |
| AU | 199959547 A1 | 6/2000 |
| AU | 200014942 A1 | 8/2000 |
| AU | 200072507 A1 | 7/2001 |
| AU | 200121249 A1 | 9/2001 |
| AU | 200131331 A1 | 12/2001 |
| AU | 200197331 A1 | 8/2002 |
| AU | 200224622 A1 | 10/2002 |
| AU | 200234300 A1 | 11/2002 |
| AU | 2002301162 A1 | 6/2003 |
| AU | 2004200464 A1 | 10/2004 |
| AU | 2004229055 A1 | 5/2005 |
| AU | 2005248933 B2 | 7/2006 |
| AU | 2006213940 A1 | 3/2007 |
| AU | 2007214435 A1 | 9/2007 |
| AU | 2008243171 A1 | 10/2009 |
| AU | 2009202435 B2 | 1/2010 |
| AU | 2011202517 B2 | 6/2011 |
| AU | 2011244889 A1 | 11/2011 |
| AU | 2013213699 A1 | 2/2014 |
| AU | 2017203507 A1 | 6/2017 |
| EP | 0982209 A1 | 1/2000 |
| NZ | 189408 A | 4/1983 |
| NZ | 216538 A | 9/1987 |
| NZ | 217708 A | 4/1998 |
| WO | 0222421 A1 | 3/2002 |
| WO | 2004054839 A2 | 7/2004 |
| WO | 2004080775 A1 | 9/2004 |
| WO | 2006122374 A1 | 11/2006 |
| WO | 2010135103 A1 | 11/2010 |
| WO | 2013181189 A1 | 12/2013 |

* cited by examiner

FIG. 7

ECP OVERLAY SYSTEM FOR UIC-TYPE DISTRIBUTOR VALVE

CROSS-REFERENCE TO RELATED APPLICATION

This application claims priority to U.S. Provisional Application Ser. No. 62/587,080, filed Nov. 16, 2017, which is hereby incorporated by reference in its entirety.

BACKGROUND OF THE INVENTION

Field of the Invention

The present invention relates to a brake apparatus for railway vehicles and, more particularly, to an ECP overlay system for a UIC-type distributor valve.

Description of Related Art

Railroad freight cars have a brake pipe that runs through each car and is coupled therebetween so as to extend continuously the length of the train. The brake pipe is charged with compressed air typically at the head end by a compressor on the locomotive. The compressed air not only provides the pneumatic brake force at the respective cars, but also serves as a communication link in which the car's brakes are controlled from the locomotive by increasing and decreasing the brake pipe pressure. Brake equipment for railroad freight cars utilizes control valves, also known as distributor valves, to control the operation of the brake cylinders and brakes for the freight cars.

UIC-type distributor valves operate similarly to American Association of Railroads (AAR) pneumatic air brake valves (such as the WABCO ABDX control valve), with a pipe bracket, a distributor valve portion, an auxiliary reservoir, and a control reservoir.

Brake equipment may include Electronically Controlled Pneumatic (ECP) systems to allow for the electronic control of the brakes rather than pneumatic control. ECP braking systems offer many advantages over pneumatic-only control, including superior braking and safety capabilities. ECP brake equipment on each rail vehicle may include a stand-alone All Electric Manifold (AEM), which contains pressure transducers, various pneumatic and electro-pneumatic valves, etc. This equipment is used to monitor the pressures in the brake pipe, the brake cylinder(s), and specific reservoirs, and to convert the electrical brake commands into a form usable by a microprocessor. Operating according to its programming code and to the dictation of the brake commands and other electrical signals it has received, the microprocessor controls the electro-pneumatic valves.

SUMMARY OF THE INVENTION

In one aspect, an ECP overlay system for a UIC-type distributor valve includes a manifold body having a pipe bracket face configured to engage a face of a pipe bracket of a railway brake system, a valve face configured to engage a face of a UIC-type distributor valve of a railway brake system, and an electric manifold face. The system further including an electric manifold assembly engaged with the electric manifold face of the manifold body, with the electric manifold assembly having a pneumatic mode where the electric manifold assembly is configured to allow pneumatic-only control of a brake cylinder of railway brake system and an ECP mode where the electric manifold assembly is configured to allow electronic control of a brake cylinder of a railway brake system.

The manifold body may further include a plurality of ports defined by the pipe bracket face, a plurality of ports defined by the valve face, and a plurality of ports defined by the electric manifold face, with the plurality of ports of the pipe bracket face in fluid communication with the plurality of ports of the valve face via a plurality of passages extending through the manifold body, and with the plurality of ports of the electric manifold face in fluid communication with the plurality of passages. The plurality of ports of the pipe bracket face and the plurality of ports of the valve face may each include an auxiliary reservoir pressure port, a brake pipe pressure port, a brake cylinder pressure port, and a control reservoir pressure port, with the auxiliary reservoir pressure ports of the pipe bracket face and the valve face in fluid communication via an auxiliary reservoir pressure passage, the brake pipe pressure ports of the pipe bracket face and the valve face in fluid communication via a brake pipe pressure passage, the brake cylinder pressure ports of the pipe bracket face and the valve face in fluid communication via a brake cylinder pressure passage, and the control reservoir pressure ports of the pipe bracket face and the valve face in fluid communication via a control reservoir pressure passage.

A plurality of ports of the electric manifold face may include an auxiliary reservoir pressure port, a brake pipe pressure port, and a brake cylinder pressure port, with the auxiliary reservoir pressure port of the electric manifold face in fluid communication with the auxiliary reservoir pressure passage, the brake pipe pressure port of the electric manifold face in fluid communication with the brake pipe pressure passage, and the brake cylinder pressure port of the electric manifold face in fluid communication with the brake cylinder pressure passage.

The electric manifold assembly may include a cut-out valve, a fill valve, and a brake cylinder exhaust valve, with the cut-out valve, the fill valve and the brake cylinder exhaust valve each having an open position and closed position, and where, when the electric manifold assembly is in the ECP mode with the fill valve in the open position and the cut-out valve and the brake cylinder exhaust valve each in the closed position, the fill valve is configured to place an auxiliary reservoir pressure passage in fluid communication with a brake cylinder pressure passage. The fill valve may be configured to place an auxiliary reservoir pressure passage in fluid communication with a brake cylinder pressure passage via a brake cylinder fill choke. When the electric manifold assembly is in the ECP mode with the brake cylinder exhaust valve in the open position and the fill valve in the closed position, the brake cylinder exhaust valve may be configured to place a brake cylinder pressure passage in fluid communication with atmospheric pressure. The brake cylinder exhaust valve may be configured to place a brake cylinder pressure passage in fluid communication with atmospheric pressure via a brake cylinder exhaust choke. The cut-out valve, the fill valve, and the brake cylinder exhaust valve may be electronically-controlled via a cut-out solenoid, a fill solenoid, and a brake cylinder exhaust solenoid, respectively.

The cut-out valve, the fill valve, and the brake cylinder exhaust valve may each be embodied as a diaphragm check valve, with the cut-out valve biased to the open position, the fill valve biased to the closed position, the brake cylinder exhaust valve biased to the open position, and with the cut-out solenoid, the fill solenoid, and the brake cylinder exhaust solenoid each configured to supply pneumatic pressure to the respective cut-out valve, the fill valve, and the brake cylinder exhaust valve to maintain the cut-out valve, the fill valve, and the brake cylinder exhaust valve in the closed position.

When the electric manifold assembly is in the pneumatic mode, the cut-out valve may be in the open position to place a brake cylinder passage in fluid communication with a brake cylinder port of the valve face of the manifold body, the fill valve is in the closed position, and the brake cylinder exhaust valve is in the closed position.

The electric manifold assembly may further include an auxiliary reservoir pressure transducer, a brake pipe pressure transducer, and a brake cylinder pressure transducer.

The manifold body may be configured to be positioned between a pipe bracket and a UIC-type distributor valve.

The electric manifold assembly may include a cut-out valve, a fill valve, and a brake cylinder exhaust valve, with the cut-out valve, the fill valve and the brake cylinder exhaust valve each having an open position and closed position, and where, when the electric manifold assembly is in the ECP mode with the fill valve in the open position and the cut-out valve and the brake cylinder exhaust valve each in the closed position, the fill valve is configured to place the auxiliary reservoir pressure passage in fluid communication with the brake cylinder pressure passage. The fill valve may be configured to place the auxiliary reservoir pressure passage in fluid communication with the brake cylinder pressure passage via a brake cylinder fill choke. When the electric manifold assembly is in the ECP mode with the brake cylinder exhaust valve in the open position and the fill valve in the closed position, the brake cylinder exhaust valve may be configured to place the brake cylinder pressure passage in fluid communication with atmospheric pressure. The brake cylinder exhaust valve may be configured to place the brake cylinder pressure passage in fluid communication with atmospheric pressure via a brake cylinder exhaust choke. The cut-out valve, the fill valve, and the brake cylinder exhaust valve are electronically-controlled via a cut-out solenoid, a fill solenoid, and a brake cylinder exhaust solenoid, respectively. The cut-out valve, the fill valve, and the brake cylinder exhaust valve each may be embodied as a diaphragm check valve, with the cut-out valve biased to the open position, the fill valve biased to the closed position, the brake cylinder exhaust valve biased to the open position, with the cut-out solenoid, the fill solenoid, and the brake cylinder exhaust solenoid each in fluid communication with the auxiliary reservoir pressure passage and configured to supply air from the auxiliary reservoir pressure passage to the respective cut-out valve, the fill valve, and the brake cylinder exhaust valve to maintain the cut-out valve, the fill valve, and the brake cylinder exhaust valve in the closed position.

When the electric manifold assembly is in the pneumatic mode, the cut-out valve may be in the open position such that a pipe bracket is configured to be fluid communication with a UIC-type distributor valve, the fill valve is in the closed position, and the brake cylinder exhaust valve is in the closed position.

Further details and advantages of the various embodiments of the invention detailed herein will become clear upon reviewing the following detailed description of the preferred embodiments in conjunction with the accompanying drawing figures.

DETAILED DESCRIPTION

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Referring to FIGS. 1-7, a UIC-type distributor valve system 1 includes a pipe bracket 2 having various pipes attached thereto for establishing a pneumatic connection between the various components of the UIC-type distributor valve system 1 to a UIC-type distributor valve 4 interfacing with the pipe bracket 2. The distributor valve 4 is in communication with an auxiliary reservoir 6 and a control reservoir 8 that each contain a supply of pressurized air. The flow of the pressurized air between various locations within the UIC-type distributor valve system 1 is controlled by the distributor valve 4 to perform various brake valve functions, including application and release of a brake cylinder 9.

Figure 4:
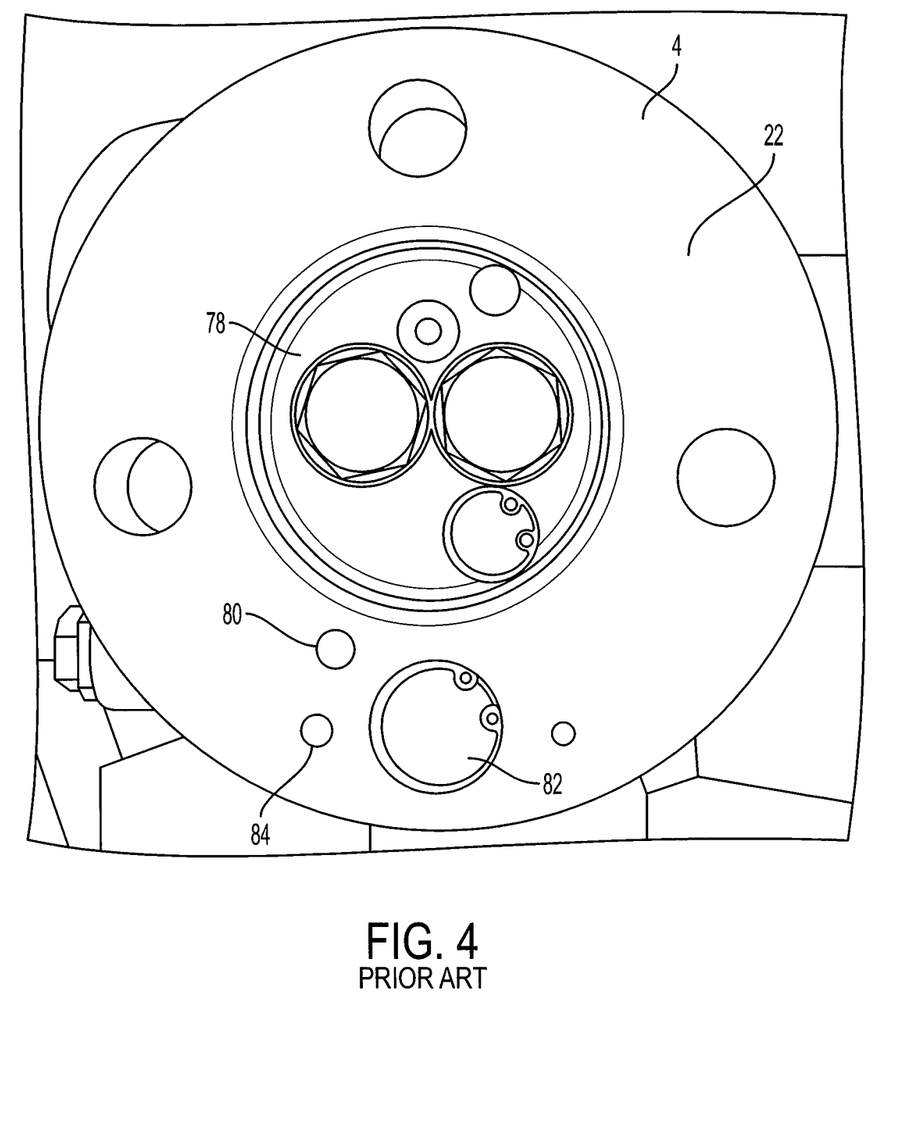
FIG. 4 is a front view of a mounting face of a UIC-type distributor valve of the braking system of FIG. 1.
Figure 5:
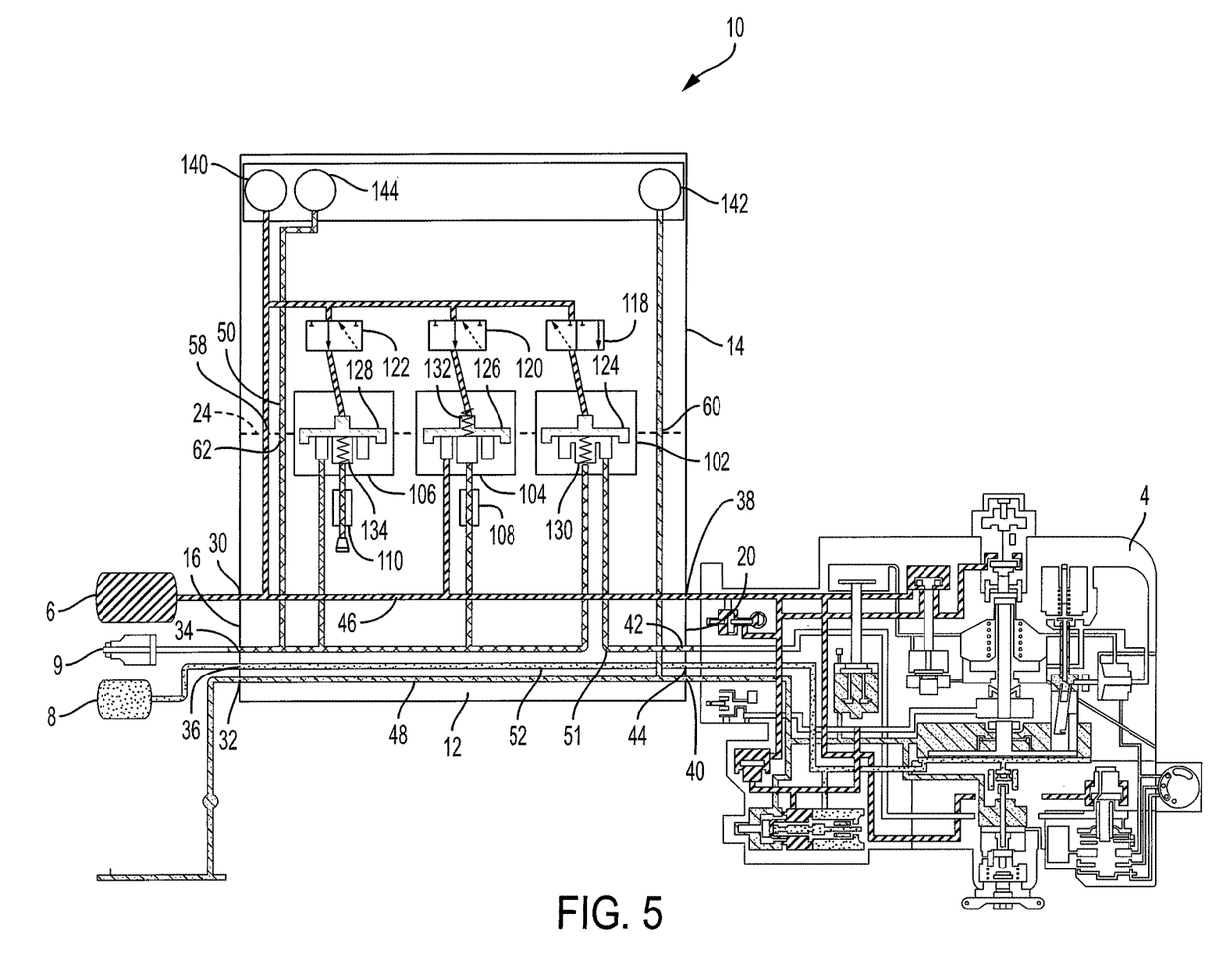
FIG. 5 is a schematic view of an ECP overlay system according to one aspect of the present invention, showing the system in a cut-out position.
Figure 6:
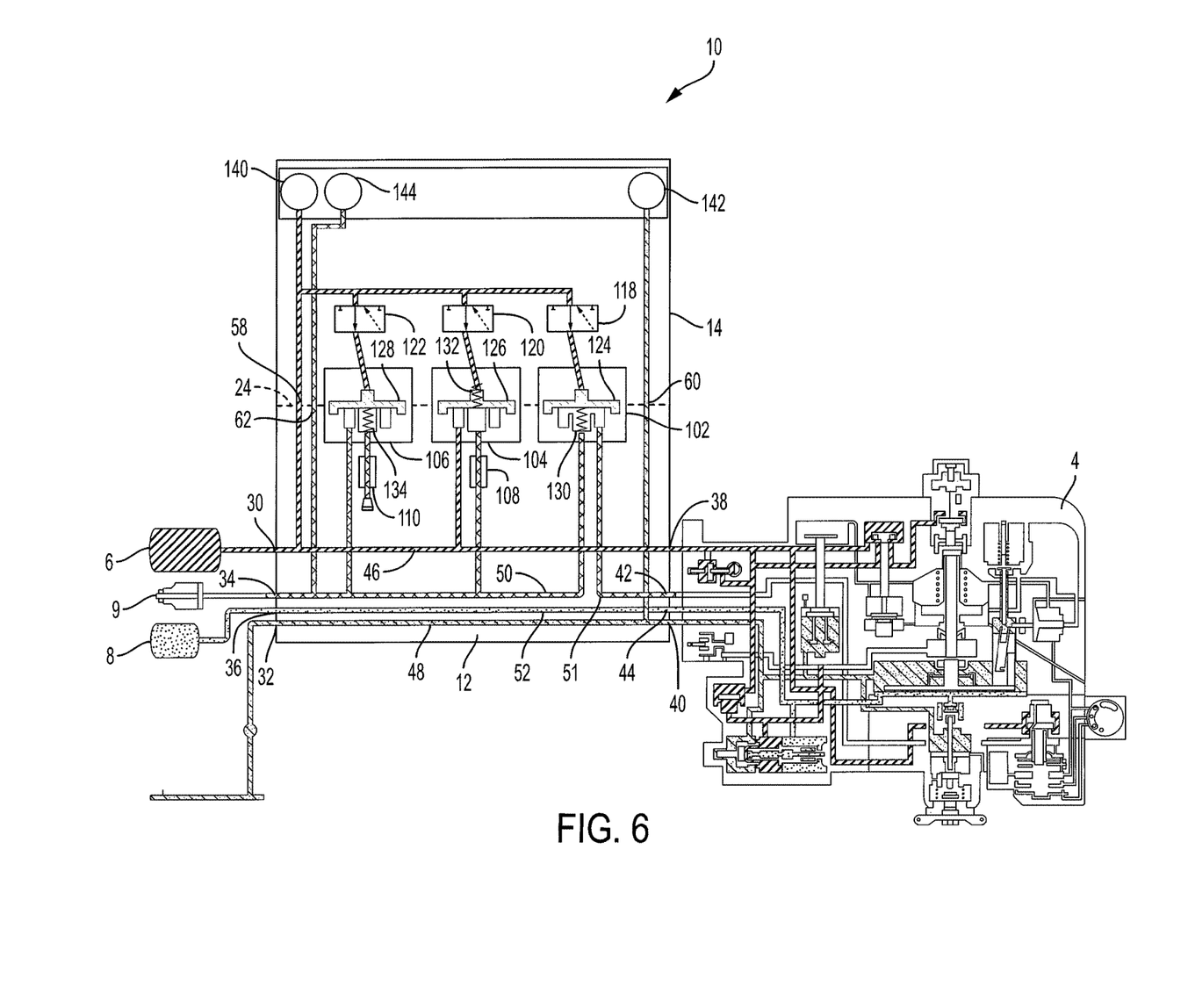
FIG. 6 is a schematic view of the ECP overlay system of FIG. 5, showing the system in a cut-in position and full release position.
Figure 7:
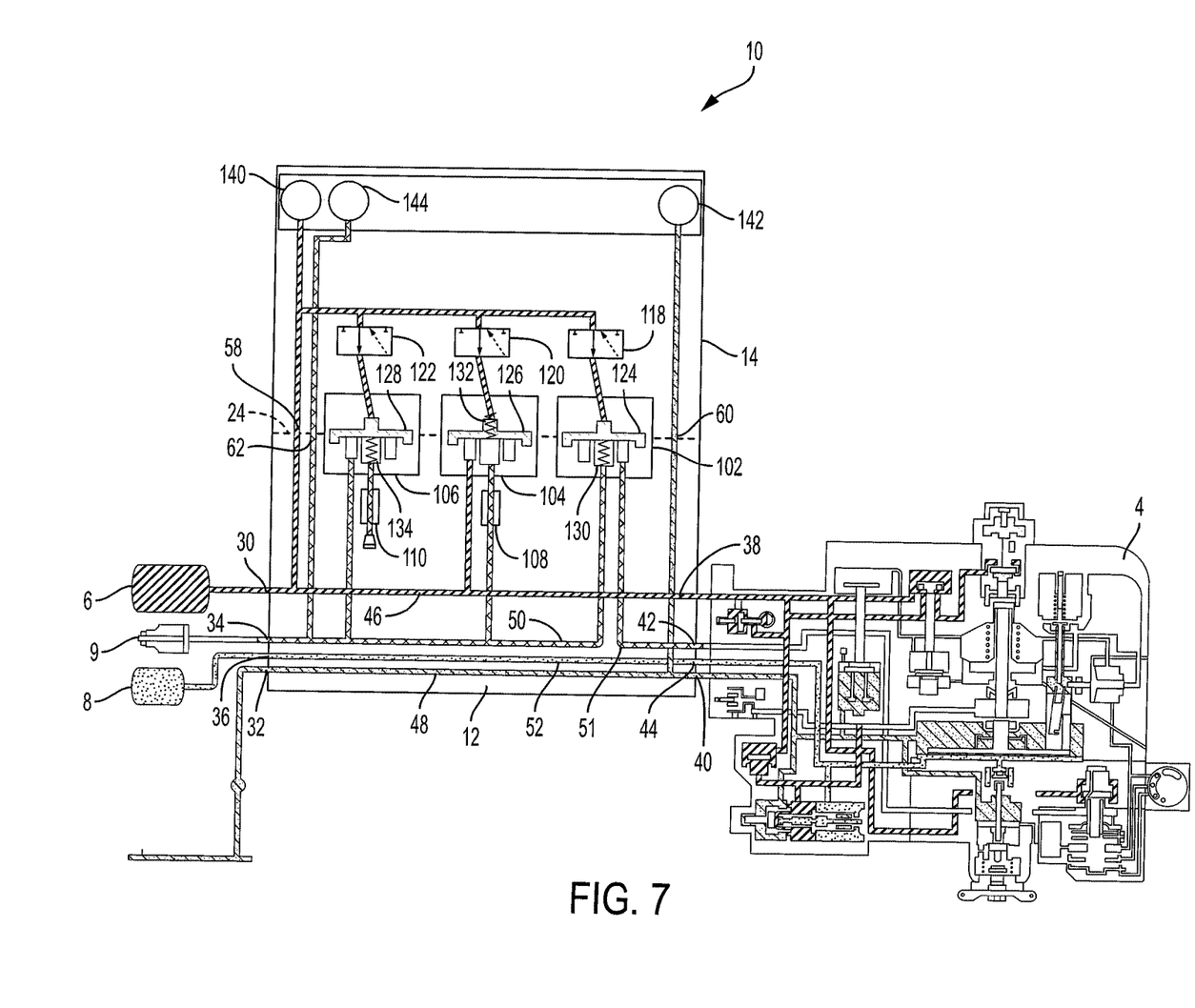
FIG. 7 is a schematic view of the ECP overlay system of FIG. 5, showing the system in a cut-in position and brakes applied position.

Referring to FIGS. 5-7, an ECP overlay system 10 for a UIC-type distributor valve 4 is shown. Although a specific configuration of the UIC-type distributor valve 4 is shown in FIGS. 1-4, the ECP overlay system 10 may be utilized in connection with various configurations of UIC-type distributor valves for UIC-type systems. The ECP overlay system 10 includes a manifold body 12 and an electric manifold assembly 14 as discussed in more detail below.

Figure 1:
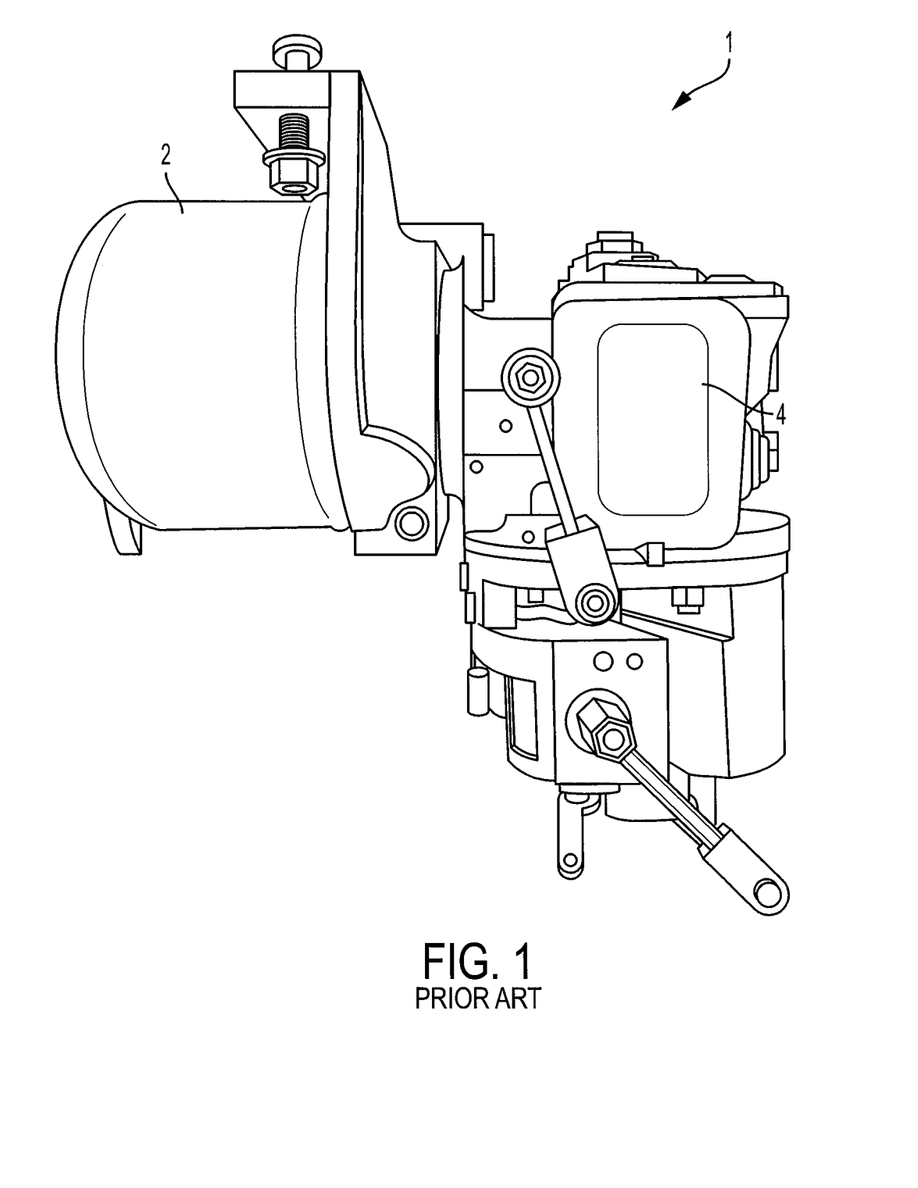
FIG. 1 is a front view of a conventional UIC-type distributor braking system.
Figure 2:
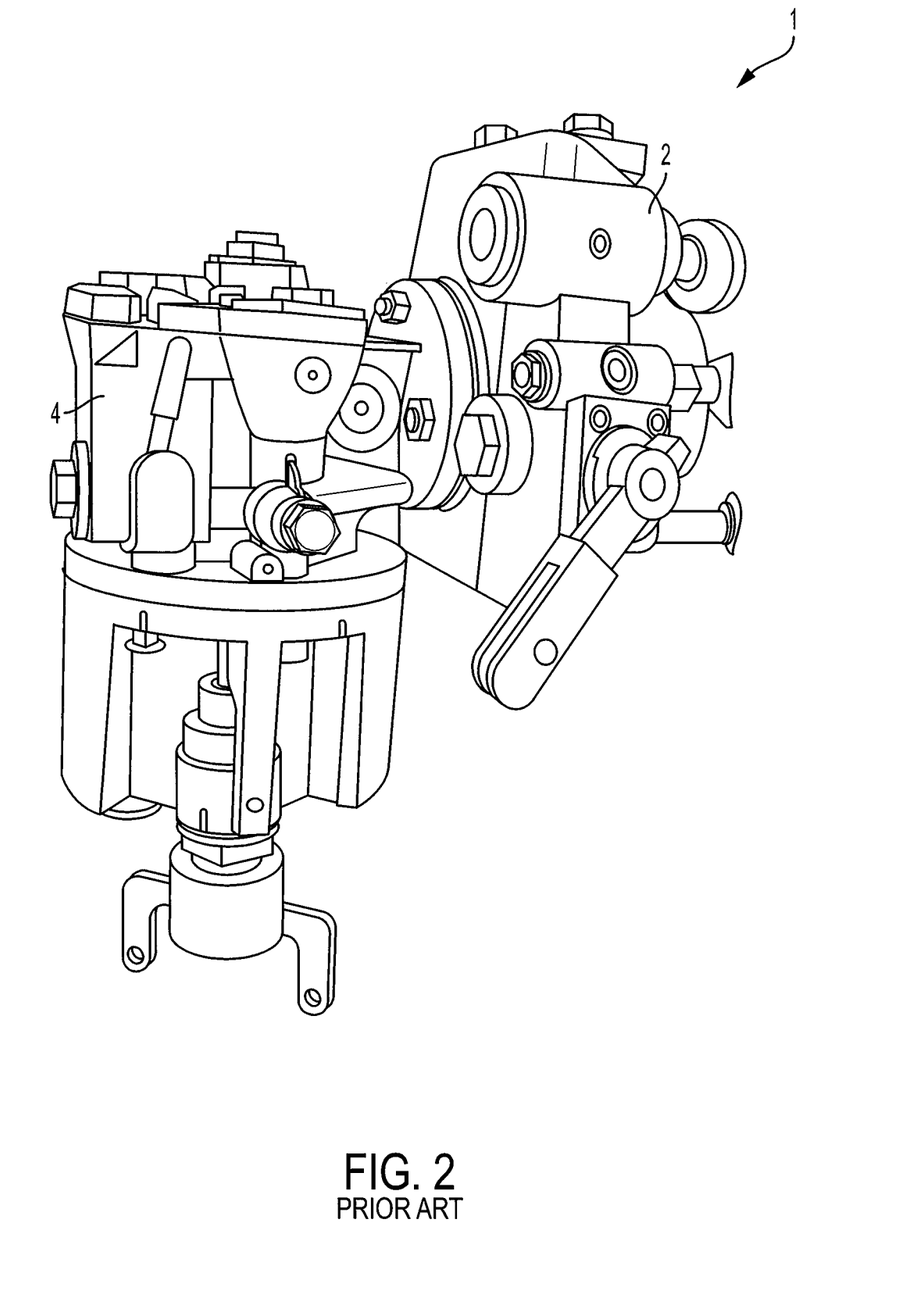
FIG. 2 is a perspective view of the braking system of FIG. 1.

Referring to FIGS. 3-7, the manifold body 12 is configured to be positioned between the pipe bracket 2 and the UIC-type distributor valve 4 shown in FIGS. 1 and 2. The manifold body 12 includes a pipe bracket face 16 configured to engage a mounting face 18 of the pipe bracket 2 of the UIC-type distributor valve system 1, a valve face 20 configured to engage a mounting face 22 of the UIC-type distributor valve 4 of the UIC-type distributor valve system 1, and an electric manifold face 24 configured to engage the electric manifold assembly 14. The pipe bracket face 16 defines an auxiliary reservoir pressure port 30, a brake pipe pressure port 32, a brake cylinder pressure port 34, and a control pressure port 36. The valve face 20 also defines an auxiliary reservoir pressure port 38, a brake pipe pressure port 40, a brake cylinder pressure port 42, and control reservoir pressure port 44. The auxiliary reservoir pressure ports 30, 38 of the pipe bracket face 16 and the valve face 20 are in fluid communication via an auxiliary reservoir pressure passage 46. The brake pipe pressure ports 32, 40 of the pipe bracket face 16 and the valve face 20 are in fluid communication via a brake pipe pressure passage 48. The brake cylinder pressure ports 34, 42 of the pipe bracket face 16 and the valve face 20 are in fluid communication via a brake cylinder pressure passage 50, a secondary brake cylinder pressure passage 51, and the cut-out valve 102. The control reservoir pressure ports 36, 44 of the pipe bracket face 16 and the valve face 20 are in fluid communication via a control reservoir pressure passage 52.

Referring to FIGS. 3-7, the electric manifold face 24 also includes an auxiliary reservoir pressure port 58, a brake pipe pressure port 60, and a brake cylinder pressure port 62. The auxiliary reservoir pressure port 58 of the electric manifold face 24 is in fluid communication with the auxiliary reservoir pressure passage 46, the brake pipe pressure port 60 of the electric manifold face 24 is in fluid communication with the brake pipe pressure passage 48, and the brake cylinder pressure port 62 of the electric manifold face 24 is in fluid communication with the brake cylinder pressure passage 50. The manifold body 12 may include a plurality of mounting openings (not shown) configured to receive mounting studs 68 from the pipe bracket 2 for securing the manifold body 12 to the pipe bracket 2 and the UIC-type distributor valve 4. The mounting studs 68 may extend through the manifold body 12 and further through a flange of the UIC-type distributor valve 4 for securing the manifold body 12 and the UIC-type distributor 4 to the pipe bracket 2. The mounting studs 68 of the pipe bracket 2 may be modified or replaced with longer studs to accommodate the manifold body 12.

Figure 3:
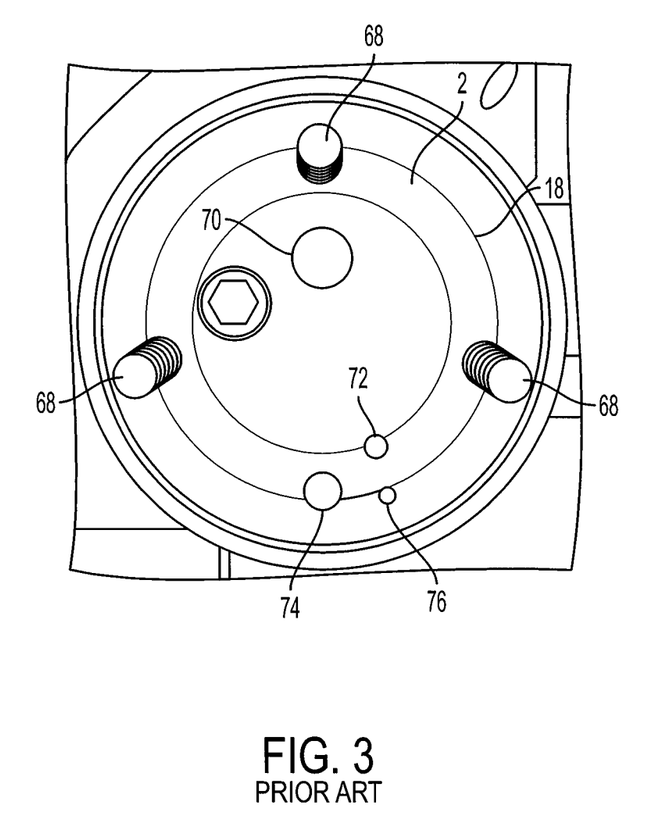
FIG. 3 is a front view of a mounting face of a pipe bracket of the braking system of FIG. 1.

Referring to FIGS. 3 and 4, the mounting face 18 of the pipe bracket 2 of the UIC-type distributor valve system 1 includes an auxiliary reservoir pressure port 70, a brake pipe pressure port 72, a brake cylinder pressure port 74, and a control reservoir pressure port 76 that are configured to be aligned with the corresponding ports 30, 32, 34, 36 of the pipe bracket face 16 of the manifold body 12 discussed above. The mounting face 22 of the UIC-type distributor valve 4 also includes an auxiliary reservoir pressure port 78, a brake pipe pressure port 80, a brake cylinder pressure port 82, and a control reservoir pressure port 84 that are configured to be aligned with the corresponding ports 38, 40, 42, 44 of the valve face 20 of the manifold body 12 discussed above. Accordingly, the manifold body 12 allows for the fluid communication between the pipe bracket 2 and the UIC-type distributor valve 4 while providing access to the various pressures of the system 1 via the electric manifold face 24 for ECP functionality.

Referring to FIGS. 5-7, the electric manifold assembly 14 is engaged with the electric manifold face 24 of the manifold body 12. The electric manifold assembly 14 may include a coin plate (not shown) secured to the manifold body 12. The electric manifold assembly 14 has a pneumatic mode where the electric manifold assembly 14 is configured to allow pneumatic-only control of a brake cylinder of railway brake system and an ECP mode where the electric manifold assembly 14 is configured to allow electronic control of a brake cylinder of a railway brake system.

Referring again to FIGS. 5-7, the electric manifold assembly 14 includes a cut-out valve 102, a fill valve 104, and a brake cylinder exhaust valve 106. The cut-out valve 102, the fill valve 104, and the brake cylinder exhaust valve 106 each have an open position and closed position. When the electric manifold assembly 14 is in the ECP mode with the fill valve 104 in the open position and the cut-out valve 102 and the brake cylinder exhaust valve 106 each in the closed position, when the brake application command is received, the fill valve 104 is configured to place the auxiliary reservoir passage 46 in fluid communication with the brake cylinder pressure passage 50. In particular, the fill valve 104 is configured to place the auxiliary reservoir passage 46 in fluid communication with the brake cylinder pressure passage 50 via a brake cylinder fill choke 108. When the electric manifold assembly 14 is in the ECP mode with the brake cylinder exhaust valve 106 in the open position and the fill valve 104 in the closed position, e.g., when a brake release command is received after a brake application, the brake cylinder exhaust valve 106 is configured to place the brake cylinder pressure passage 50 in fluid communication with atmospheric pressure. In particular, the brake cylinder exhaust valve 106 is configured to place the brake cylinder pressure passage 50 in fluid communication with atmospheric pressure via a brake cylinder exhaust choke 110.

When placed in ECP mode (ECP electronically cut-in) with the brakes in a released position, the brake cylinder exhaust valve 106 and fill valve 104 are closed and the cut-out valve 102 is open such that the brake cylinder passage 50 is in fluid communication with the UIC-type distributor valve 4 via the secondary brake cylinder passage 51 until an ECP brake command is initiated. In this position, the brake cylinder 9 may be controlled pneumatically via the UIC-type distributor valve 4 or the electric manifold assembly 14 using ECP brake commands. Upon receiving an ECP brake application command, the cut-out valve 102 is closed with the fill valve 104 and the brake cylinder exhaust valve 106 opening and closing, as necessary, to obtain and maintain the target pressure within the brake cylinder 9, as noted above and discussed in more detail below.

When the electric manifold assembly 14 is in the pneumatic mode (ECP electronically cut-out), as shown in FIG. 5, the cut-out valve 102 is in the open position to place the first brake cylinder passage 50 and brake cylinder 9 in fluid communication with the UIC-type distributor valve 4 via the secondary brake cylinder passage 51 and the brake cylinder port 42 of the valve face 20 of the manifold body 12, the fill valve 104 is in the closed position, and the brake cylinder exhaust valve 106 is in the closed position. The cut-out valve 102 is configured to place the brake cylinder passage 50 in fluid communication with the UIC-type distributor valve 4 thereby allowing the UIC-type distributor valve 4 via the secondary brake cylinder passage 51 to be pneumatically responsible for applying and releasing the brake cylinder 9.

The cut-out valve 102, the fill valve 104, and the brake cylinder exhaust valve 106 are electronically-controlled via a cut-out solenoid 118, a fill solenoid 120, and a brake cylinder exhaust solenoid 122, respectively. The cut-out valve 102, the fill valve 104, and the brake cylinder exhaust valve 106 are each diaphragm check valves having a diaphragm 124, 126, 128, although other suitable valve arrangements may be utilized. The cut-out valve 102 is biased to the open position, the fill valve 104 is biased to the closed position, and the brake cylinder exhaust valve 106 is biased to the open position. The cut-out valve 102, the fill valve 104, and the brake cylinder exhaust valve 106 may be biased to their respective position via respective springs 130, 132, 134, although other suitable arrangements may be utilized. The cut-out solenoid 118, the fill solenoid 120, and the brake cylinder exhaust solenoid 122 are each configured to supply pneumatic pressure to the respective cut-out valve 102, the fill valve 104, and the brake cylinder exhaust valve 106 to maintain the cut-out valve 102, the fill valve 104, and the brake cylinder exhaust valve 106 in the closed position. As shown in FIGS. 5-7, the pneumatic pressure may be pressure from the auxiliary reservoir passage 46 supplied via the solenoids 118, 120, 122 to the respective diaphragms 124, 126, 128 of the valves 102, 104, 106. Opening and closing of the solenoids 118, 120, 122 controls whether the auxiliary reservoir passage 46 pressure acts on the diaphragms 124, 126, 128 of the valves 102, 104, 106 thereby controlling whether the valves 102, 104, 106 are in the open or closed position.

The cut-out valve 102 is in fluid communication with the brake cylinder passage 50 and secondary brake cylinder passage 51 and is configured to place the UIC-type distributor valve 4 in fluid communication with the brake cylinder passage 50 when the cut-out valve 102 is in the open position. The UIC-type distributor valve 4 is isolated from the brake cylinder port 74 of the pipe bracket 2 and the brake cylinder 9 when the cut-out valve 102 is in the closed position. The fill valve 104 is in fluid communication with the auxiliary reservoir passage 46 and the brake cylinder passage 50 with the auxiliary reservoir passage 46 being in fluid communication with the brake cylinder passage 50 when the fill valve 104 is in the open position. The auxiliary reservoir passage 46 is isolated from the brake cylinder passage 50 when the fill valve 104 is in the closed position. The brake cylinder exhaust valve 106 is in fluid communication with the brake cylinder passage 50 and atmospheric pressure via the brake cylinder exhaust choke 110. The brake cylinder pressure passage 50 is in fluid communication with atmospheric pressure with the brake cylinder exhaust valve 106 in the open position. The brake cylinder pressure passage 50 is isolated from atmospheric pressure when the brake cylinder exhaust valve 106 is in the closed position.

Referring again to FIGS. 5-7, the electric manifold assembly 14 further includes an auxiliary reservoir pressure transducer 140, a brake pipe pressure transducer 142, and a brake cylinder pressure transducer 144 to measure the respective pressures of the passages 46, 48, 50.

Pneumatic Mode

Referring to FIG. 5, the electric manifold assembly 14 is in pneumatic mode (ECP electronically cut-out) to provide for pneumatic-only control of the UIC-type distributor valve system 1. In pneumatic mode, the electric manifold assembly 14 is electronically cut out. The cut-out valve 102 is in the open position (solenoid 118 de-energized) to allow the brake cylinder passage 50 and brake cylinder 9 to be in fluid communication with the UIC-type distributor valve 4 via the secondary brake cylinder passage 51 and port 42. The fill valve 104 and the brake cylinder exhaust valve 106 are in the closed position (solenoids 120, 122 de-energized) and pressurized on their seats by the auxiliary reservoir passage 46 pressure via the solenoids 120, 122 thereby isolating the auxiliary reservoir passage 46 from the brake cylinder pressure passage 50 as well as isolating the brake cylinder pressure passage 50 from atmosphere via the brake cylinder exhaust valve 106. Accordingly, the UIC-type distributor valve 4 is pneumatically responsible for applying and releasing the brake cylinder 9 on the freight vehicle based on manipulations of brake pipe pressure in the train.

ECP Mode in Release Position

Referring to FIG. 6, the electric manifold assembly 14 is in ECP mode (ECP electronically cut-in) to provide electronic control of the UIC-type distributor valve system 1 with the UIC-type distributor valve 4 in a release position, i.e., the electric manifold assembly 14 is cut-in with the brake system in a release position. The electric manifold assembly 14 is placed in ECP mode electronically. The brake pipe of the train and the brake pipe passage 48 are maintained at the system supply charge pressure such that UIC-type distributor valve 4 never develops a pressure differential required internally to effect a brake application thereby keeping the UIC-type distributor valve 4 in the release position. As noted above, however, in the position shown in FIG. 6, the brake cylinder 9 may be controlled pneumatically via the UIC-type distributor valve 4 based on brake pipe passage 48 pressure or the electric manifold assembly 14 using ECP brake commands. The cut-out valve 102 is in the open position (solenoid 118 de-energized) to place the brake cylinder passage 50 and brake cylinder 9 in fluid communication with the UIC-type distributor valve 4 via secondary brake cylinder passage 51. When the ECP overlay system 10 is placed in ECP mode with the brake system in a release position, the fill valve 104 and the brake cylinder exhaust valve 106 are in the closed position (solenoids 120, 122 de-energized) and pressurized on their seats by the auxiliary reservoir passage 46 pressure via the solenoids 120, 122 thereby isolating the auxiliary reservoir passage 46 from the brake cylinder passage 50 as well as isolating the brake cylinder passage 50 from atmosphere via the brake cylinder exhaust valve 106.

ECP Mode in Application Position

Referring to FIG. 7, the electric manifold assembly 14 is in ECP mode (electronically cut-in) to provide electronic control of the UIC-type distributor valve system 1 with the system 10 in an application position. The brake pipe of the train and the brake pipe passage 48 are maintained at the system supply charge pressure such that UIC-type distributor valve 4 never develops a pressure differential required internally to effect a brake application thereby keeping the UIC-type distributor valve 4 in the release position. While in ECP mode and when a signal for electronic braking is obtained, the cut-out valve 102 is moved to the closed position (solenoid 118 energized) and held on its seat by pressure from the auxiliary reservoir passage 46 via the cut-out solenoid 118. In other words, the cut-out solenoid 118 is energized or actuated to allow the flow of air from the auxiliary reservoir passage 46 to the top side of the diaphragm 124 of the cut-out valve 102 to move the cut-out valve 102 to the closed position. The fill valve 104 is moved to the open position by energizing or actuating the fill solenoid 120 to isolate the flow of air from the auxiliary reservoir passage 46 to the top side of the diaphragm 126 of the fill valve 104 and vents the air from the top side of the diaphragm 126 thereby allowing the pressure from the auxiliary reservoir passage 46 to overcome the biasing force of the spring 132 of the fill valve 104 to unseat the diaphragm 126. With the fill valve 104 in the open position, pressure from the auxiliary reservoir passage 46 is directed to the brake cylinder passage 50 via the brake cylinder fill choke 108 to effect a brake application. The brake cylinder exhaust valve 106 remains in the closed position (solenoid 122 de-energized) and pressurized on its seat by the auxiliary reservoir passage 46 pressure via the brake cylinder exhaust solenoid 122 thereby isolating the brake cylinder passage 50 from the atmosphere via the brake cylinder exhaust valve 106. The fill valve 104 and the brake cylinder exhaust valve 106 are opened and closed (via energizing or de-energizing the solenoids 120, 122), as necessary, to obtain and maintain a target pressure within the brake cylinder 9. Accordingly, when a target brake cylinder pressure is obtained, the fill valve 104 will close with the fill valve 104 re-opening or the brake cylinder exhaust valve 106 opening if there is leakage out of the brake cylinder 9 or leakage into the brake cylinder 9, respectively. The fill valve 104 is moved to the closed position by de-energizing the fill solenoid 120 to direct pressure from the auxiliary reservoir passage 46 to the top of diaphragm 126 of the fill valve 104. With the fill valve 104 in the closed position, the auxiliary reservoir passage 46 is isolated from the brake cylinder passage 50.

While in ECP mode and when the signal to release brake cylinder pressure is obtained, the fill valve 104 is in the closed position (solenoid 120 de-energized) and the brake cylinder exhaust valve 106 is moved to the open position (solenoid 122 energized) thereby allowing brake cylinder pressure to vent to atmosphere via the brake cylinder exhaust choke 110 to release the brake application. The brake cylinder exhaust valve 106 is moved to the open position by energizing or actuating the brake cylinder exhaust solenoid 122 to isolate the pressure from the auxiliary reservoir passage 46 from the top of the diaphragm 128 of the brake cylinder exhaust valve 106 and vents the air from the top side of the diaphragm 128. The cut-out valve 102 will remain closed until the pressure within the brake cylinder passage 50 reaches a predetermined pressure, such as 0 psi +/−5 psi. When the predetermined pressure is reached, the cut-out valve 102 will open, the brake cylinder exhaust valve 106 will close and the fill valve 104 will remain closed.

The ECP overlay system 10 is configured to minimize the amount of electrical power that is utilized. The solenoids 118, 120, 122 are only energized during an ECP application, with the cut-out solenoid 118 energized the duration of the brake application and the fill solenoid 120 and the brake cylinder exhaust solenoid 122 energized for a time period only necessary to obtain and maintain a target pressure within the brake cylinder 9.

While embodiments of ECP overlay system 10 were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. An electronically controlled pneumatic (ECP) overlay system, the ECP overlay system comprising:
a manifold body comprising a pipe bracket face configured to engage a face of a pipe bracket of a brake system, a valve face configured to engage a mounting face of a main portion of a distributor valve of the brake system, and an electric manifold face;
an electric manifold assembly engaged with the electric manifold face of the manifold body, the electric manifold assembly having a pneumatic mode where the electric manifold assembly is configured to allow pneumatic-only control of a brake cylinder of the brake system and an ECP mode where the electric manifold assembly is configured to allow electronic control of a brake cylinder of the brake system, the electric manifold assembly also including a cut-out valve, a fill valve, and a brake cylinder exhaust valve, the cut-out valve, the fill valve, and the brake cylinder exhaust valve each having an open position and closed position, and wherein, while the electric manifold assembly is in the ECP mode with the fill valve in the open position and the cut-out valve and the brake cylinder exhaust valve each in the closed position, the fill valve is configured to place a reservoir pressure passage in fluid communication with a brake cylinder pressure passage, wherein the cut-out valve, the fill valve, and the brake cylinder exhaust valve are electronically-controlled via a cut-out solenoid, a fill solenoid, and a brake cylinder exhaust solenoid, respectively, and
wherein the cut-out valve, the fill valve, and the brake cylinder exhaust valve each comprise a diaphragm check valve, the cut-out valve biased to the open position, the fill valve biased to the closed position, the brake cylinder exhaust valve biased to the open position, the cut-out solenoid, the fill solenoid, and the brake cylinder exhaust solenoid each configured to supply pneumatic pressure to the respective cut-out valve, the fill valve, and the brake cylinder exhaust valve to change the cut-out valve and the brake cylinder exhaust valve to the closed position and maintain the fill valve in the closed position.

2. The system of claim 1, wherein the manifold body further comprises a plurality of first ports defined by the pipe bracket face, a plurality of second ports defined by the valve face, and a plurality of third ports defined by the electric manifold face, the plurality of first ports of the pipe bracket face are in fluid communication with the plurality of second ports of the valve face via a plurality of passages extending through the manifold body, the plurality of third ports of the electric manifold face are in fluid communication with the plurality of passages.

3. The system of claim 2, wherein the plurality of first ports of the pipe bracket face and the plurality of second ports of the valve face each comprise a reservoir pressure port, a brake pipe pressure port, a brake cylinder pressure port, and an additional discharge channel pressure port, the reservoir pressure ports of the pipe bracket face and the valve face are in fluid communication via a reservoir pressure passage, the brake pipe pressure ports of the pipe bracket face and the valve face are in fluid communication via a brake pipe pressure passage, the brake cylinder pressure ports of the pipe bracket face and the valve face are in fluid communication via the brake cylinder pressure passage, the additional discharge channel pressure ports of the pipe bracket face and the valve face are in fluid communication via a discharge channel passage.

4. The system of claim 3, wherein the plurality of third ports of the electric manifold face comprise a reservoir pressure port, a brake pipe pressure port, and a brake cylinder pressure port, the reservoir pressure port of the electric manifold face is in fluid communication with the reservoir pressure passage, the brake pipe pressure port of the electric manifold face is in fluid communication with the brake pipe pressure passage, and the brake cylinder pressure port of the electric manifold face is in fluid communication with the brake cylinder pressure passage.

5. The system of claim 1, wherein the fill valve is configured to place a reservoir pressure passage in fluid communication with the brake cylinder pressure passage via a brake cylinder fill choke.

6. The system of claim 1, wherein, while the electric manifold assembly is in the ECP mode with the brake cylinder exhaust valve in the open position and the fill valve in the closed position, the brake cylinder exhaust valve is configured to place the brake cylinder pressure passage in fluid communication with atmospheric pressure.

7. The system of claim 6, wherein the brake cylinder exhaust valve is configured to place the brake cylinder pressure passage in fluid communication with atmospheric pressure via a brake cylinder exhaust choke.

8. The system of claim 1, wherein, while the electric manifold assembly is in the pneumatic mode, the cut-out valve is in the open position to place a brake cylinder passage in fluid communication with a brake cylinder port of the valve face of the manifold body, the fill valve is in the closed position, and the brake cylinder exhaust valve is in the closed position.

9. The system of claim 1, wherein the electric manifold assembly further comprises a reservoir pressure transducer, a brake pipe pressure transducer, and a brake cylinder pressure transducer.

10. The system of claim 1, wherein the manifold body is configured to be positioned between the pipe bracket and a main portion of the distributor valve.

11. The system of claim 1, wherein the fill valve is configured to place the reservoir pressure passage in fluid communication with the brake cylinder pressure passage via a brake cylinder fill choke.

12. The system of claim 1, wherein, while the electric manifold assembly is in the ECP mode with the brake cylinder exhaust valve in the open position and the fill valve in the closed position, the brake cylinder exhaust valve is configured to place the brake cylinder pressure passage in fluid communication with atmospheric pressure.

13. The system of claim 12, wherein the brake cylinder exhaust valve is configured to place the brake cylinder pressure passage in fluid communication with atmospheric pressure via a brake cylinder exhaust choke.

14. The system of claim 1, wherein the cut-out solenoid, the fill solenoid, and the brake cylinder exhaust solenoid are each in fluid communication with the reservoir pressure passage and configured to supply air from the reservoir pressure passage to the respective cut-out valve, the fill valve, and the brake cylinder exhaust valve to maintain the cut-out valve, the fill valve, and the brake cylinder exhaust valve in the closed position.

15. The system of claim 1, wherein, while the electric manifold assembly is in the pneumatic mode, the cut-out valve is in the open position to place the brake cylinder pressure passage in fluid communication with a main portion of a the distributor valve, the fill valve is in the closed position, and the brake cylinder exhaust valve is in the closed position.

* * * * *